United States Patent
Patel et al.

(10) Patent No.: US 11,948,289 B2
(45) Date of Patent: Apr. 2, 2024

(54) SYSTEMS AND METHODS FOR PRECISELY AND ACCURATELY IDENTIFYING A METER READING FROM AN ANALOG METER USING IMAGE PROCESSING TECHNIQUES

(71) Applicant: Verizon Patent and Licensing Inc., Basking Ridge, NJ (US)

(72) Inventors: Hitesh K. Patel, San Diego, CA (US); Benjamin D. Allen, New York, NY (US); Gaurav Goel, Los Gatos, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 457 days.

(21) Appl. No.: 17/379,413

(22) Filed: Jul. 19, 2021

(65) Prior Publication Data
US 2023/0019755 A1   Jan. 19, 2023

(51) Int. Cl.
*G06T 7/00* (2017.01)
*G06Q 10/0631* (2023.01)
*G06T 5/00* (2006.01)
*G06T 7/62* (2017.01)
*G06T 7/64* (2017.01)
*G06T 7/70* (2017.01)
(Continued)

(52) U.S. Cl.
CPC ....... *G06T 7/0004* (2013.01); *G06Q 10/0631* (2013.01); *G06T 5/002* (2013.01); *G06T 5/009* (2013.01); *G06T 7/62* (2017.01); *G06T 7/64* (2017.01); *G06T 7/70* (2017.01); *G08B 5/22* (2013.01); *G08B 21/18* (2013.01); *H04Q 9/00* (2013.01); *G06T 2207/10016* (2013.01); *G06T 2207/30164* (2013.01)

(58) Field of Classification Search
None
See application file for complete search history.

(56) References Cited

U.S. PATENT DOCUMENTS

| | | | | |
|---|---|---|---|---|
| 5,673,331 A | * | 9/1997 | Lewis | G06V 10/10 340/870.02 |
| 5,870,140 A | * | 2/1999 | Gillberry | G01D 5/39 348/160 |

(Continued)

OTHER PUBLICATIONS

Chen et al. "Computer Vision-Based Approach for Reading Analog Multimeter", Appl. Sci. 2018 (Year: 2018).*

(Continued)

*Primary Examiner* — Randolph I Chu

(57) ABSTRACT

A device may receive frames of a video capturing an analog meter with a dial and a needle, may process the frames to identify a center, a radius, and a perimeter of the dial, and may determine calibrated values for the dial. The device may apply a model to one of the frames to create a base mask, may apply thresholding for a dynamic HSV bounding value, to the base mask and the frames, to create masked frames, and may identify contours for the masked frames. The device may identify a quantity of points for each of the contours, may estimate angles of the needle of the analog meter based on the quantity of points, and may average the estimated angles to determine an averaged needle angle. The device may determine a needle direction based on the averaged needle angle and may calculate a meter reading.

20 Claims, 10 Drawing Sheets

(51) Int. Cl.
  *G08B 5/22* (2006.01)
  *G08B 21/18* (2006.01)
  *H04Q 9/00* (2006.01)

(56) References Cited

U.S. PATENT DOCUMENTS

| | | | |
|---|---|---|---|
| 6,845,177 | B2 | 1/2005 | Chiu |
| 8,411,896 | B2 * | 4/2013 | Sim .................. G01D 4/008 382/100 |
| 8,594,365 | B2 * | 11/2013 | Derkalousdian ........ G06F 18/00 382/152 |
| 8,786,706 | B2 | 7/2014 | Kennedy et al. |
| 10,102,617 | B2 * | 10/2018 | Gozdowiak ............... B09B 3/00 |
| 10,108,874 | B2 * | 10/2018 | Petruk ...................... G08B 6/00 |
| 10,354,137 | B2 * | 7/2019 | Russell .................. G06V 20/00 |
| 11,301,712 | B2 * | 4/2022 | He ...................... G06F 18/2135 |
| 11,328,162 | B2 * | 5/2022 | Olson .................. G06V 10/758 |
| 2001/0055425 | A1 * | 12/2001 | Chiu ........................ G01D 5/39 382/199 |
| 2007/0171092 | A1 * | 7/2007 | Allgood ................. G01D 4/008 340/870.02 |
| 2008/0309475 | A1 * | 12/2008 | Kuno ..................... B60K 35/00 340/462 |
| 2009/0190795 | A1 * | 7/2009 | Derkalousdian ........ G06F 18/00 348/160 |
| 2011/0227927 | A1 * | 9/2011 | Garmon ................. G01D 13/22 345/440 |
| 2012/0194683 | A1 * | 8/2012 | Goldberg ............... G01D 4/002 348/160 |
| 2014/0286580 | A1 * | 9/2014 | Kennedy ................ G01D 4/002 382/203 |
| 2016/0086034 | A1 * | 3/2016 | Kennedy ................ G06V 10/28 382/200 |
| 2017/0089692 | A1 * | 3/2017 | Chattopadhyay ...... G01D 18/00 |
| 2018/0096205 | A1 * | 4/2018 | Russell .................. G06V 20/00 |
| 2021/0142102 | A1 * | 5/2021 | Al Rashdan ......... G06V 10/225 |
| 2021/0201026 | A1 * | 7/2021 | Lin ........................... G06T 1/00 |

OTHER PUBLICATIONS

Zheng et al. "A robust and automatic recognition system of analog instruments in power system by using computer vision", Measurement 92 (2016) 413-420 (Year: 2016).*

Hung et al. "Automatic Pointer Meter Reading Based on Machine Vision", 2019 IEEE 4th International Conference on Image, Vision and Computing (Year: 2019).*

Wang et al. "Automatic Reading System for Analog Instruments Based on Computer Vision and Inspection Robot for Power Plant", 10th International Conference on Modelling, Identification and Control (ICMIC), July, 2-4, 2018 (Year: 2018).*

Robert Sablatnig, C. Hansen, "Machine vision for automatic calibration of analog display instruments," Proc. SPIE 2423, Machine Vision Applications in Industrial Inspection III, (Mar. 27, 1995); doi: 10.1117/12.205522 (Year: 1995).*

Ma et al., "A robust and high-precision automatic reading algorithm of pointer meters based on machine vision", Measurement Science and Technology (Year: 2018).*

Ueda et al. "A Two-Stage Deep Learning-Based Approach for Automatic Reading of Analog Meters", Joint 11th International Conference on Soft Computing and Intelligent Systems and 21st International Symposium on Advanced Intelligent Systems (Year: 2020).*

Huang et al. "An Automatic Analog Instrument Reading System Using Computer Vision and Inspection Robot", IEEE Transactions on Instrumentation and Measurement, vol. 69, No. 9, Sep. 2020 (Year: 2020).*

Tran et al. "Computer Vision System for Reading Analog Gauges at Power Substation", 2021 International Symposium on Electrical and Electronics Engineering (ISEE) (Year: 2021).*

Guo et al. "Intelligent pointer meter interconnection solution for data collection in farmlands", Computers and Electronics in Agriculture 182 (2021) (Year: 2021).*

Sowah, et al. "Intelligent Instrument Reader Using Computer Vision and Machine Learning", 2018-IACC (Year: 2018).*

Zhuo et al. "Machine Vision Detection of Pointer Features in Images of Analog Meter Displays", Metrology and Measurement Systems, vol. 27 (2020) No. 4, pp. 589-599 (Year: 2020).*

Kang et al. "Research on Automatic Recognition Algorithm of Pointer Meter Based on Machine Vision", 2021 IEEE 6th International Conference on Intelligent Computing and Signal Processing (ICSP 2021) (Year: 2021).*

* cited by examiner

SYSTEMS AND METHODS FOR PRECISELY AND ACCURATELY IDENTIFYING A METER READING FROM AN ANALOG METER USING IMAGE PROCESSING TECHNIQUES

BACKGROUND

An analog meter may include various analog implements, such as a pointer or a meter needle, to indicate a measurement level provided on a dial of the analog meter. An analog meter may include a pressure gauge, an analog multimeter, an analog voltmeter, an analog ammeter, and/or the like.

DETAILED DESCRIPTION OF PREFERRED EMBODIMENTS

Figure 1A:
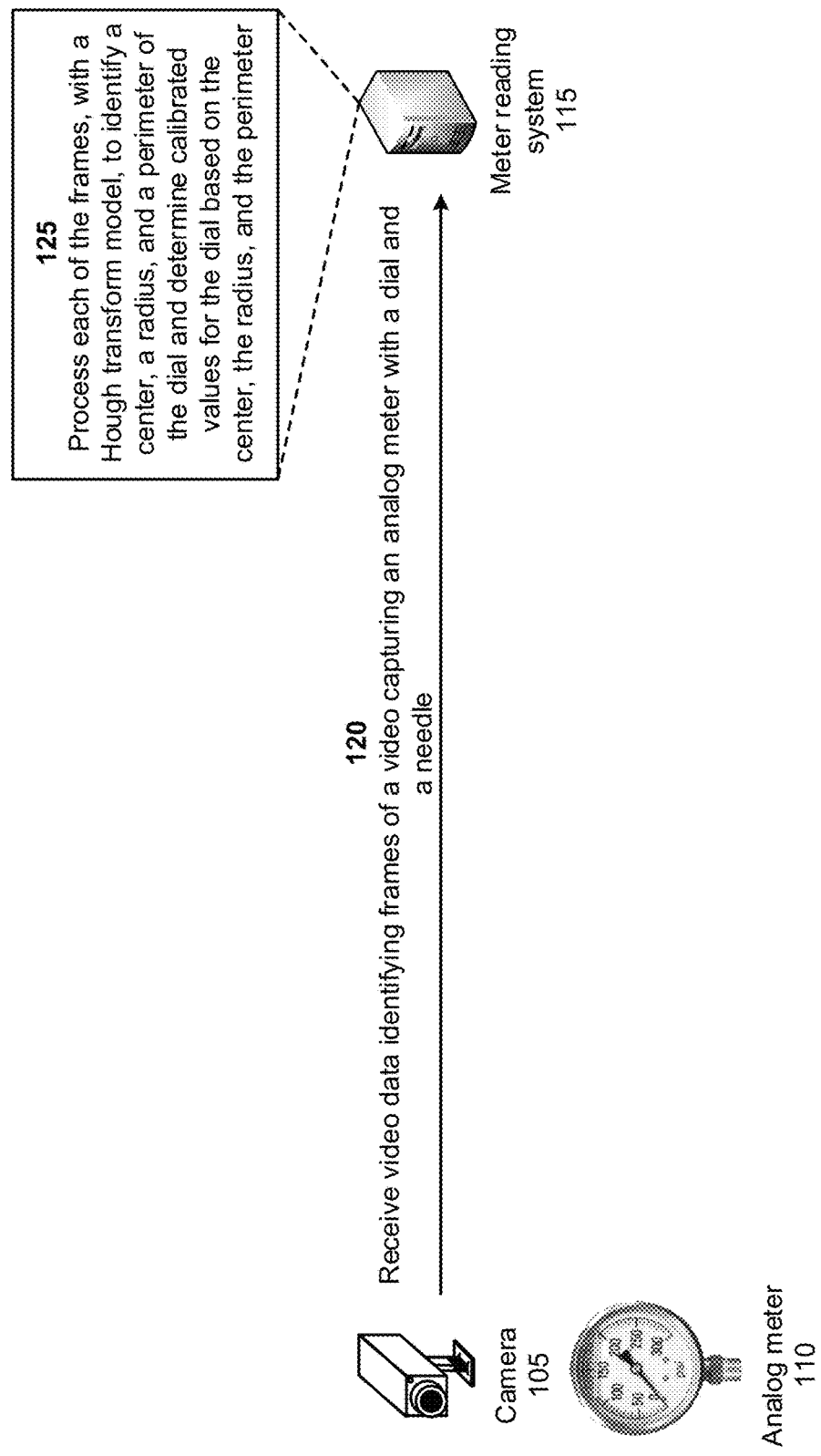
FIGS. 1A-1G are diagrams of an example associated with precisely and accurately identifying a meter reading from an analog meter with a needle and dial.

The following detailed description of example implementations refers to the accompanying drawings. The same reference numbers in different drawings may identify the same or similar elements.

An analog meter may be utilized by equipment (e.g., measurement equipment, manufacturing equipment, and/or the like) to provide a measurement of a parameter (e.g., a pressure, a voltage, amperes, Ohms, and/or the like) associated with the equipment. Currently there are many different types of analog meters and trained personnel are required to travel to the analog meters and read the analog meters. Such personnel may incorrectly read the analog meters at times. Furthermore, replacing the many different types of analog meters with digital meters (e.g., smart meters) may be too expensive and/or time consuming. Thus, current techniques for utilizing and reading analog meters consume computing resources (e.g., processing resources, memory resources, communication resources, and/or the like), networking resources, transportation resource, and/or other resources associated with traveling to the analog meters and reading the analog meters, incorrectly reading the analog meters, unnecessarily performing an action on equipment associated with the incorrectly read analog meters, correcting records/invoices that are based on incorrect readings, dealing with customers who are upset about incorrect readings, and/or the like.

Some implementations described herein provide a meter reading system that precisely and accurately identifies a meter reading from an analog meter (e.g., a meter with a horizontal linear display, a vertical linear display, a circular dial, and/or the like). For example, the meter reading system may receive video data identifying frames of a video capturing the analog meter and may process each of the frames, with a model (e.g., a Hough transform model), to identify a center, a radius, and a perimeter of a dial in analog meter with a needle and dial. The meter reading system may determine calibrated values for the dial based on the center, the radius, and the perimeter and may apply a model (e.g., a Gaussian blur model) to one of the frames to create a base mask. The meter reading system may apply thresholding for a dynamic hue saturation value (HSV) bounding value, to the base mask and the frames, to create masked frames, and may identify contours for each of the masked frames. The meter reading system may identify a quantity of points for each of the contours of each of the frames and may estimate angles of the needle of the analog meter based on the quantity of points for each of the contours. The meter reading system may average the estimated angles to determine an averaged needle angle and may determine a needle direction based on the averaged needle angle. The meter reading system may calculate a meter reading for the analog meter based on the averaged needle angle, the needle direction, and the calibrated values, and may provide the meter reading for display.

In this way, the meter reading system precisely and accurately identifies a meter reading from an analog meter with a needle and dial. For example, the meter reading system may receive video frames of the analog meter and may identify a center, a radius and a perimeter of the dial using a Hough transform. The meter reading system may calibrate the dial to identify minimum and maximum readings and may apply, to the video frames, dynamic Hough parameters to generate masked frames for further processing. The meter reading system may process the masked frames, with intelligent logic, to precisely identify moving contour points in each direction from each masked frame. The meter reading system may derive an angle of the needle based on movement of the contour points and may apply the angle of the needle to the calibrated dial to accurately determine a reading of the analog meter. Thus, implementations described herein may conserve computing resources, networking resources, and other resources that would have otherwise been consumed by traveling to the analog meters and reading the analog meters, incorrectly reading the analog meters, unnecessarily performing an action on equipment associated with the incorrectly read analog meters, correcting records/invoices that are based on incorrect readings, dealing with customers who are upset about incorrect readings, and/or the like.

FIGS. 1A-1G are diagrams of an example 100 associated with precisely and accurately identifying a meter reading from an analog meter with a needle and dial. As shown in FIGS. 1A-1G, example 100 includes a camera 105, an analog meter 110, and a meter reading system 115. Further details of the camera 105, the analog meter 110, and the meter reading system 115 are provided elsewhere herein. In some implementations, one or more of the functions described herein as being performed by the meter reading system 115 may be performed by the camera 105, a computing device associated with the camera, and/or the like, alone or in conjunction with the meter reading system 115.

As shown in FIG. 1A, and by reference number 120, the meter reading system 115 may receive, from the camera 105, video data identifying frames of a video capturing the analog meter 110 with a dial and a needle. For example, the camera 105 may be installed at a location of the analog meter 110 and may continuously, periodically, and/or the like capture the video of the analog meter 110. In some implementations, the camera 105 may continuously provide the video to the meter reading system 115, may periodically provide the video to the meter reading system 115, may provide the video to the meter reading system 115 based on a request for the video received from the meter reading system 115, and/or the like. In some implementations, the meter reading system 115 may store the video in a data structure (e.g., a database, a table, a list, and/or the like) associated with the meter reading system 115.

As further shown in FIG. 1A, and by reference number 125, the meter reading system 115 may process each of the frames, with a Hough transform model, to identify a center, a radius, and a perimeter of the dial and may determine calibrated values for the dial based on the center, the radius, and the perimeter of the dial. The Hough transform model is a feature extraction model used in image analysis, computer vision, and digital image processing. The Hough transform model may identify imperfect instances of objects within a certain class of shapes by a voting procedure. The voting procedure may be carried out in a parameter space from which object candidates are obtained as local maxima in an accumulator space and a parameter space that is explicitly constructed for computing the Hough transform. For example, the meter reading system 115 may utilize the Hough transform model to extract features of the dial of the analog meter 110, such as the center, the radius, and the perimeter of the dial of the analog meter 110. In some implementations, if the dial of the analog meter 110 is not circular (or if the dial is circular and a video of the dial is taken from an angle), the meter reading system 115 may utilize the Hough transform model to extract other features of the dial. In some implementations, the calibrated values for the dial of the analog meter 110 may include a minimum reading of the dial, a maximum reading of the dial, a unit of measure of the dial, incremental readings of the dial, and/or the like.

Figure 1B:
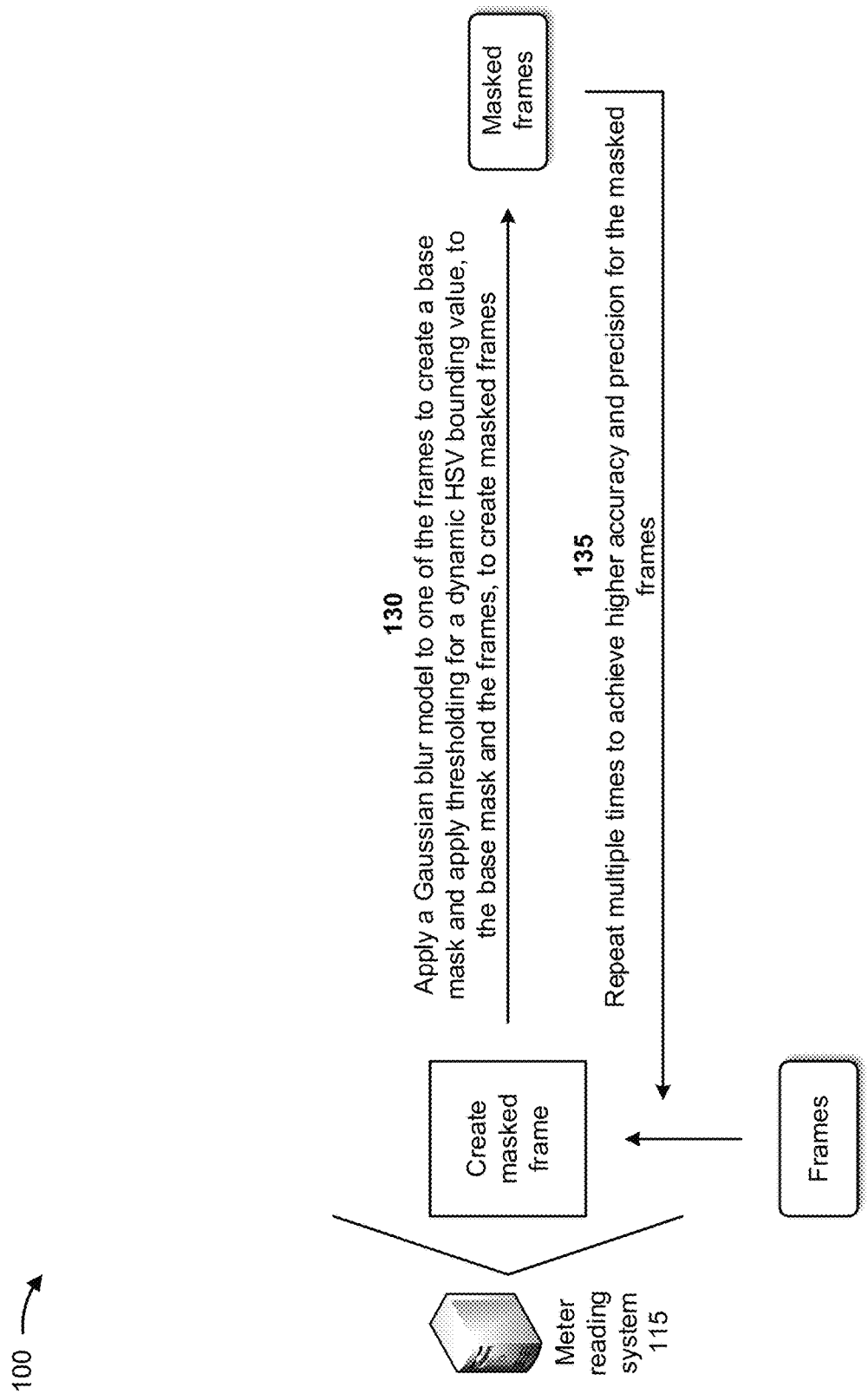

As shown in FIG. 1B, and by reference number 130, the meter reading system 115 may apply a Gaussian blur model to one of the frames to create a base mask and may apply thresholding for a dynamic hue saturation value (HSV) bounding value, to the base mask and the frames, to create masked frames. The Gaussian blur model may utilize a Gaussian function to blur (e.g., also known as Gaussian smoothing) the one of the frames to create the base mask. The base mask may include the image of the one of the frames with reduced image noise and reduced detail. For example, the base mask may include a smooth blur resembling that of viewing the image of the one of the frames through a translucent screen.

The dynamic HSV bounding value may be applied via an HSV color model. The HSV color model may transform a red green blue (RGB) color space, of the images of the frames and the base mask, to the HSV color space to generate the masked frames. The masked frames may include components and colorimetry that are related to the RGB color space (e.g., the images of the frames) from which the masked frames are derived. In some implementations, the meter reading system 115 may apply dynamic Hough parameters, to the base mask and the frames, to generate the masked frames for further processing.

As further shown in FIG. 1B, and by reference number 135, the meter reading system 115 may repeat applying the Gaussian blur model and applying the thresholding for the dynamic HSV bounding value multiple times to achieve higher accuracy and precision for the masked frames. For example, the meter reading system 115 may perform the applying of the Gaussian blur model and the applying of the thresholding for the dynamic HSV bounding value one or more additional times to achieve greater accuracy and precision for the masked frames. In some implementations, by repeating the applying of the Gaussian blur model and the applying of the thresholding for the dynamic HSV bounding value, the meter reading system 115 may reduce image noise in the masked frames, which may provide greater accuracy and precision for the masked frames.

Figure 1C:
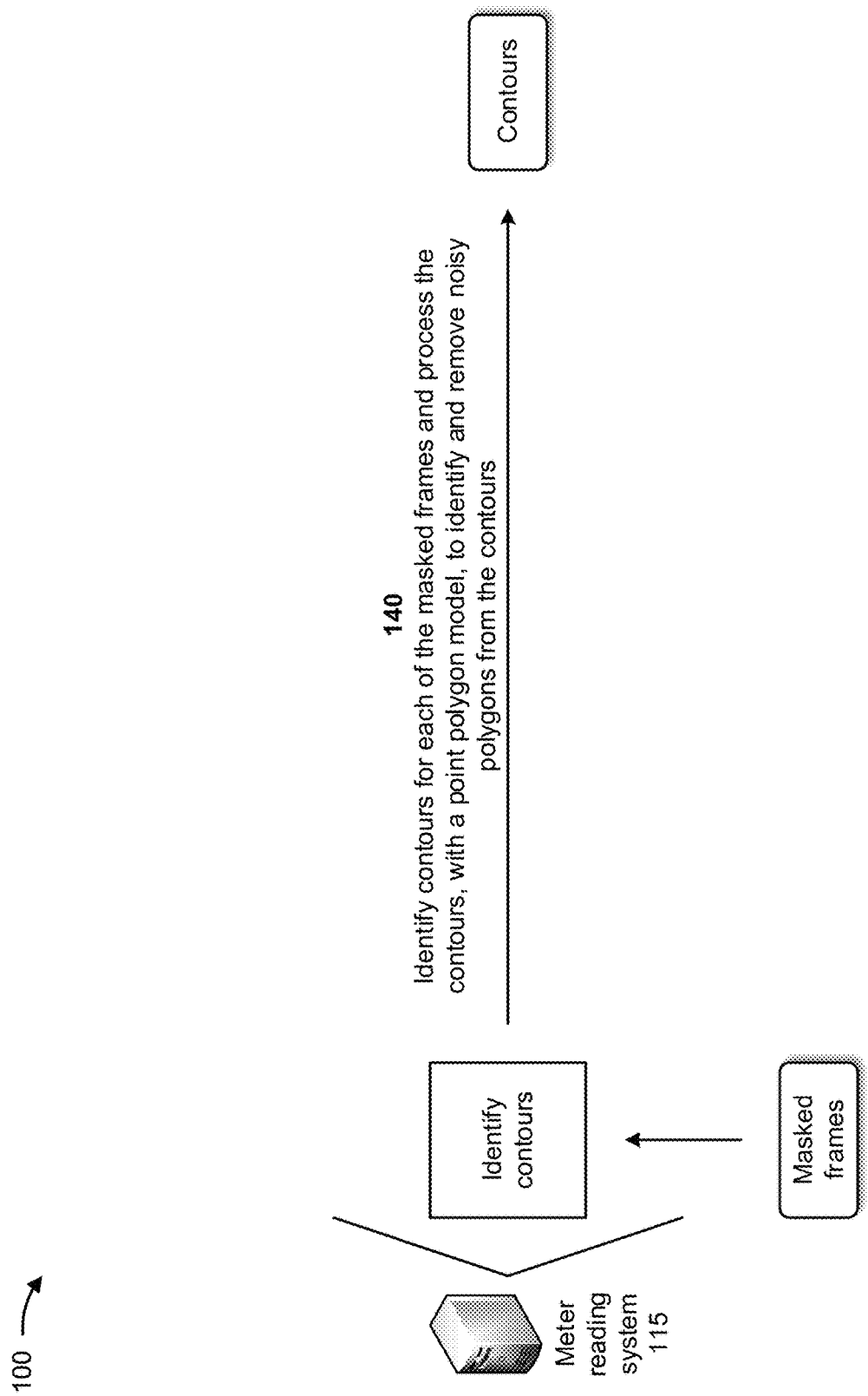

As shown in FIG. 1C, and by reference number 140, the meter reading system 115 may identify contours for each of the masked frames and may process the contours, with a point polygon model, to identify and remove noisy polygons from the contours. A contour is a closed curve joining continuous points having some color or intensity. A contour may represent shapes of objects found in an image. The meter reading system 115 may utilize a contour detection model, a Canny model, an OpenCV model, a Hough transform model, a k-means segmentation model, and/or the like to identify the contours for each of the masked frames. The meter reading system 115 may manipulate the contours by, for example, counting a quantity of the contours, using the contours to categorize the shapes of the objects, cropping objects from an image (e.g., image segmentation), and/or the like.

A polygon is a two-dimensional feature created by multiple lines that loop back to create a closed feature. In the case of a polygon, a first coordinate pair (e.g., a point) on a first line segment is the same as a last coordinate pair on a last line segment. The point polygon model may include a model that generates a low-resolution version of a higher resolution image by identifying and removing polygons (e.g., noisy polygons) from the higher resolution image. For example, the point polygon model may process the contours for each of the masked frames and may identify polygons of the contours that satisfy a threshold noise level. The point polygon model may remove the identified noisy polygons from the contours for each of the masked frames.

Figure 1D:
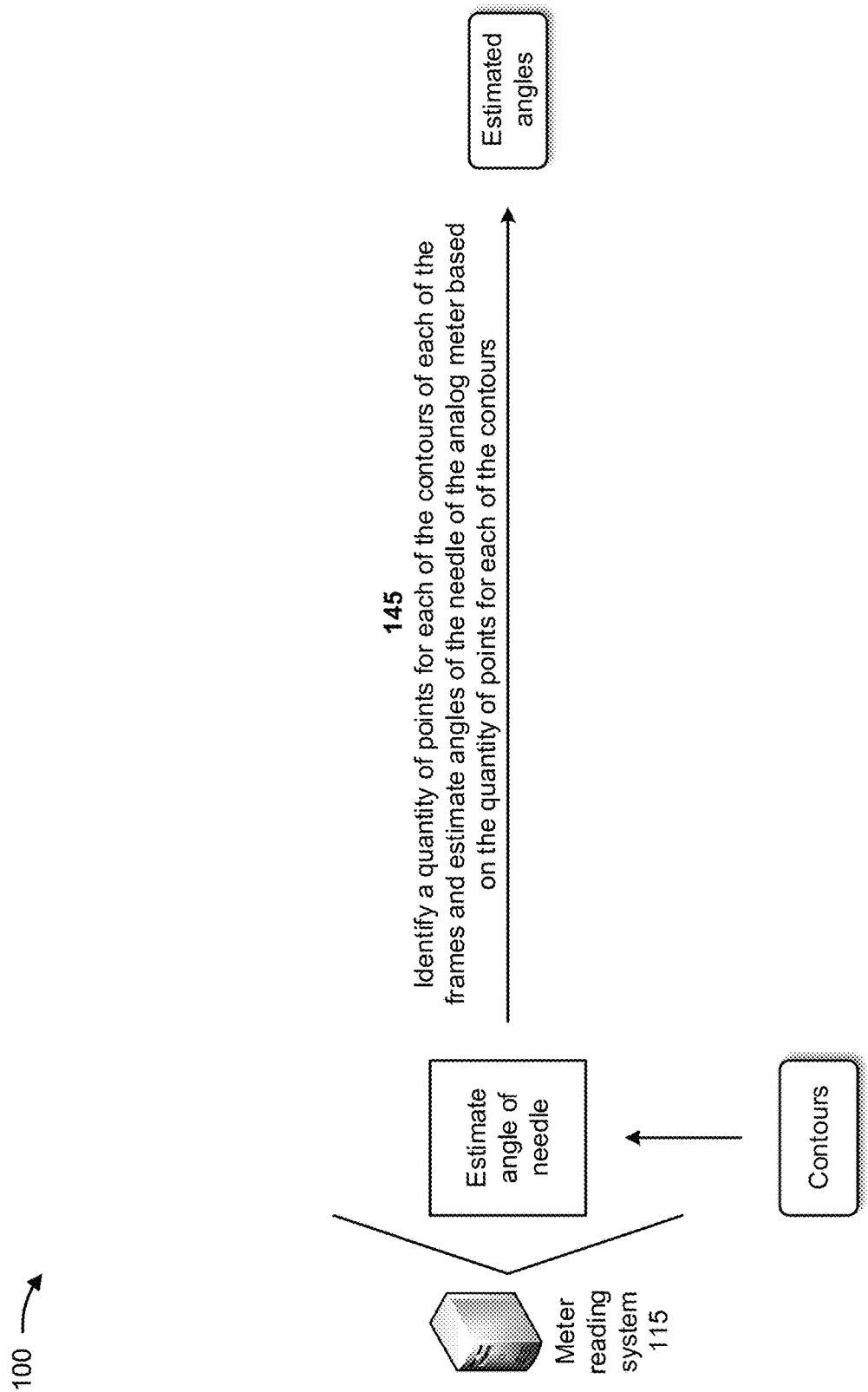

As shown in FIG. 1D, and by reference number 145, the meter reading system 115 may identify a quantity of points for each of the contours of each of the frames and may estimate angles of the needle of the analog meter 110 based on the quantity of points for each of the contours. In some implementations, the quantity of points includes two points, three points, four points, five points, six points, and/or the like. For example, when identifying the quantity of points for each of the contours of each of the frames, the meter reading system 115 may identify a northern point for each of the contours, may identify a southern point for each of the contours, may identify an eastern point for each of the contours, may identify a western point for each of the contours, and/or the like.

The meter reading system 115 may utilize the directional points (e.g., a northern point, a southern point, an eastern point, and a western point) of a contour to estimate an angle of the needle of the analog meter 110. The meter reading system 115 may estimate additional angles of the needle of the analog meter 110 based on the directional points associated with the remaining contours. In some implementations, the meter reading system 115 may determine a first estimated angle of the needle of the analog meter 110 based on the quantity of points for a first contour, may determine a second estimated angle of the needle of the analog meter 110 based on the quantity of points for a second contour, determine a third estimated angle of the needle of the analog meter 110 based on the quantity of points for a third contour, and/or the like.

Figure 1E:
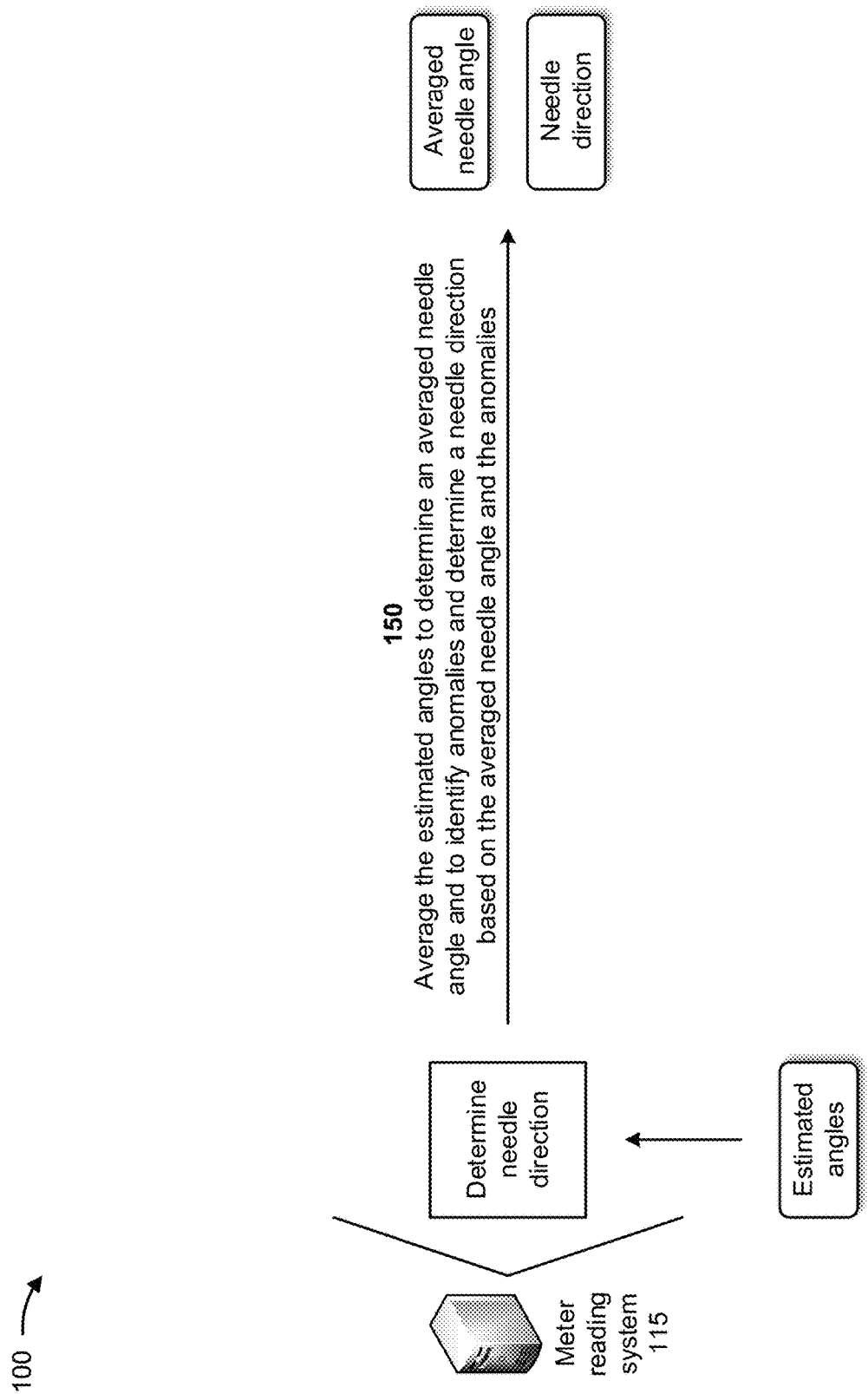

As shown in FIG. 1E, and by reference number 150, the meter reading system 115 may average the estimated angles to determine an averaged needle angle and to identify anomalies, and may determine a needle direction based on the averaged needle angle and the anomalies. For example, the meter reading system 115 may calculate an average of the estimated angles to determine the averaged needle angle and may calculate a standard deviation of the averaged needle angle. In some implementations, the meter reading system 115 may compare the averaged needle angle and the estimated angles to identify the anomalies in the estimated angles. For example, if a particular estimated angle is greater than or less the standard deviation from averaged needle angle, the meter reading system 115 may determine that the particular estimated angle is an anomaly. In some implementations, the meter reading system 115 may remove the anomalous estimated angles and may recalculate the average of the estimated angles (e.g., without the anomalous estimated angles) to determine a new averaged needle angle.

The meter reading system 115 may determine the needle direction based on the averaged needle angle and the anomalies or based on the new averaged needle angle. In some implementations, the averaged needle angle and the needle direction may be based on a coordinate plane, where an averaged needle angle of zero degrees may correspond to a needle direction to the east, an averaged needle angle of ninety degrees may correspond to a needle direction to the north, an averaged needle angle of one-hundred and eighty degrees may correspond to a needle direction to the west, an averaged needle angle of two-hundred and seventy degrees may correspond to a needle direction to the south, and/or the like.

Figure 1F:
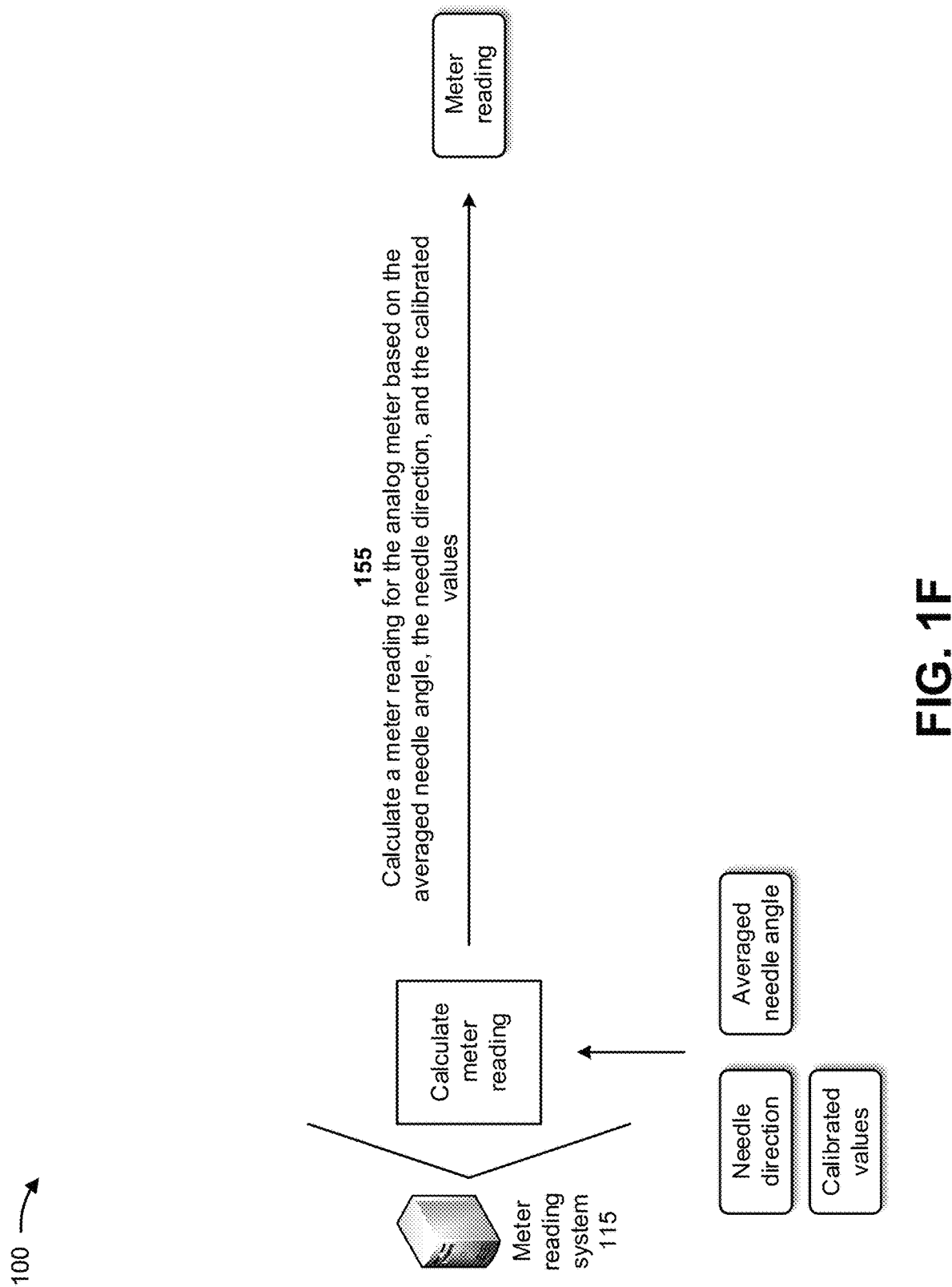

As shown in FIG. 1F, and by reference number 155, the meter reading system 115 may calculate a meter reading for the analog meter 110 based on the averaged needle angle, the needle direction, and the calibrated values. In some implementations, the meter reading system 115 may apply the averaged needle angle and the needle direction, to the calibrated values for the dial of the analog meter 110 (e.g., the minimum reading of the dial, the maximum reading of the dial, the unit of measure of the dial, the incremental readings of the dial, and/or the like), to calculate the meter reading for the analog meter 110. For example, if the averaged needle angle is ninety degrees, the needle direction is to the north, and the calibrated values indicate a value (e.g., 500 pounds per square inch (psi), 600 volts, and/or the like) at ninety degrees (or north) on the dial, the meter reading system 115 may determine that the meter reading is the indicated value.

Figure 1G:
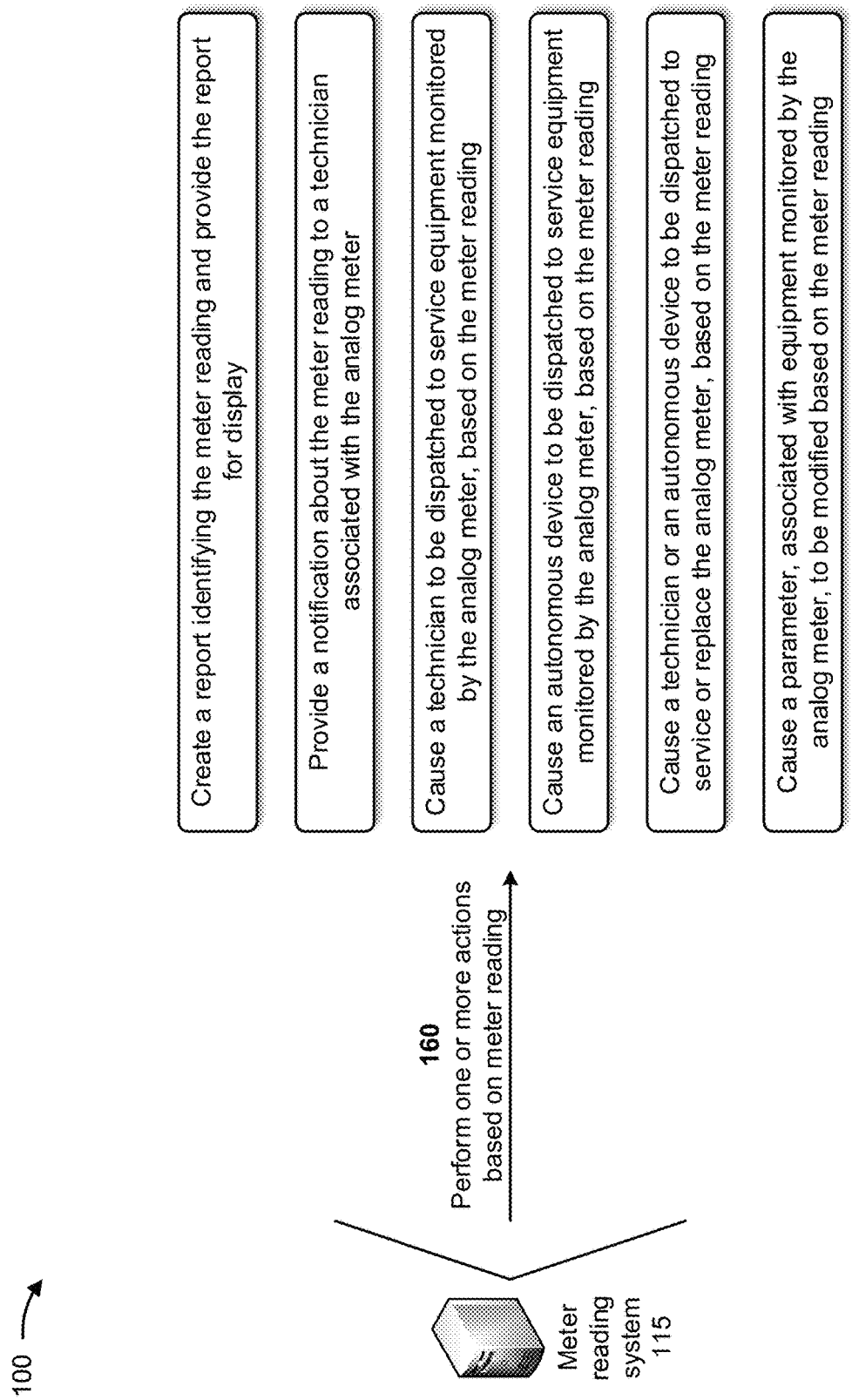

As shown in FIG. 1G, and by reference number 160, the meter reading system 115 may perform one or more actions based on the meter reading. For example, the one or more actions may include the meter reading system 115 creating a report identifying the meter reading and providing the report for display. For example, the meter reading system 115 may create a report that includes meter readings for the analog meter 110 over a time period and may include the meter reading in the report. The meter reading system 115 may provide the report to a device of a technician associated with the analog meter 110 or equipment monitored by the analog meter 110. The device may display the report to the technician so that technician may determine whether the analog meter 110 and/or the equipment are operating properly. In this way, the meter reading system 115 may conserve computing resources, networking resources, and other resources that would have otherwise been consumed by the technician traveling to the analog meter 110 and reading the analog meter 110, incorrectly reading the analog meter 110, unnecessarily performing an action on equipment associated with the incorrectly read analog meter 110, and/or the like.

In some implementations, the one or more actions include the meter reading system 115 providing a notification about the meter reading to a technician associated with the analog meter 110. For example, the meter reading system 115 may provide the meter reading to a device of a technician associated with the analog meter 110. The device may display the meter reading to the technician so that the technician may determine whether the analog meter 110 is operating properly. In this way, the meter reading system 115 may conserve computing resources, networking resources, and other resources that would have otherwise been consumed by the technician traveling to the analog meter 110 and checking the analog meter 110, utilizing a faulty analog meter 110, unnecessarily performing an action on equipment associated with the faulty analog meter 110, and/or the like.

In some implementations, the one or more actions include the meter reading system 115 causing a technician to be dispatched to service equipment monitored by the analog meter 110, based on the meter reading. For example, the meter reading system 115 may determine that the meter reading indicates that the equipment monitored by the analog meter 110 is not performing correctly. Based on this determination, the meter reading system 115 may cause the technician to be dispatched to service the equipment monitored by the analog meter 110. In this way, the meter reading system 115 may conserve computing resources, networking resources, and other resources that would have otherwise been consumed by the incorrectly operating equipment, the delays associated with discovering the incorrectly operating equipment, manufacturing downtime associated with the incorrectly operating equipment, and/or the like.

In some implementations, the one or more actions include the meter reading system 115 causing an autonomous device to be dispatched to service equipment monitored by the analog meter 110, based on the meter reading. For example, the meter reading system 115 may determine that the meter reading indicates that the equipment monitored by the analog meter 110 is not performing correctly. Based on this determination, the meter reading system 115 may cause the autonomous device (e.g., a mobile robot) to be dispatched to service the equipment monitored by the analog meter 110. In this way, the meter reading system 115 may conserve computing resources, networking resources, and other resources that would have otherwise been consumed by the incorrectly operating equipment, the delays associated with discovering the incorrectly operating equipment, manufacturing downtime associated with the incorrectly operating equipment, and/or the like.

In some implementations, the one or more actions include the meter reading system 115 causing a technician or an autonomous device to be dispatched to service or replace the analog meter 110, based on the meter reading. For example, the meter reading system 115 may determine that the meter reading indicates that the analog meter 110 is not operating correctly. Based on this determination, the meter reading system 115 may cause the technician or the autonomous device to be dispatched to service or replace the analog meter 110. In this way, the meter reading system 115 may conserve computing resources, networking resources, and other resources that would have otherwise been consumed by the technician traveling to the analog meter 110 and checking the analog meter 110, utilizing an inoperable analog meter 110, unnecessarily performing an action on equipment associated with the inoperable analog meter 110, and/or the like.

In some implementations, the one or more actions include the meter reading system 115 causing a parameter, associated with equipment monitored by the analog meter 110, to be modified based on the meter reading. For example, the meter reading system 115 may determine that the meter reading indicates that a parameter associated with the equipment monitored by the analog meter 110 needs to be modified. The meter reading system 115 may provide, to the equipment, an instruction to modify the parameter, and the equipment may modify the parameter based on the instruction. In this way, the meter reading system 115 may conserve computing resources, networking resources, and other resources that would have otherwise been consumed by the incorrectly operating equipment, the delays associated with discovering the incorrectly operating equipment, manufacturing downtime associated with the incorrectly operating equipment, and/or the like.

In this way, the meter reading system 115 precisely and accurately identifies a meter reading from the analog meter 110 with a needle and dial. For example, the meter reading system 115 may receive video frames of the analog meter 110 and may identify a center, a radius and a perimeter of the dial using a Hough transform. The meter reading system 115 may calibrate the dial to identify minimum and maximum readings and may apply, to the video frames, dynamic Hough parameters to generate masked frames for further processing. The meter reading system 115 may process the masked frames, with intelligent logic, to precisely identify moving contour points in each direction from each masked frame. The meter reading system 115 may derive an angle of the needle based on movement of the contour points and may apply the angle of the needle to the calibrated dial to accurately determine a reading of the analog meter 110. Thus, implementations described herein may conserve computing resources, networking resources, and other resources that would have otherwise been consumed by traveling to analog meters and reading analog meters, incorrectly reading analog meters, unnecessarily performing an action on equipment associated with the incorrectly read analog meters, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
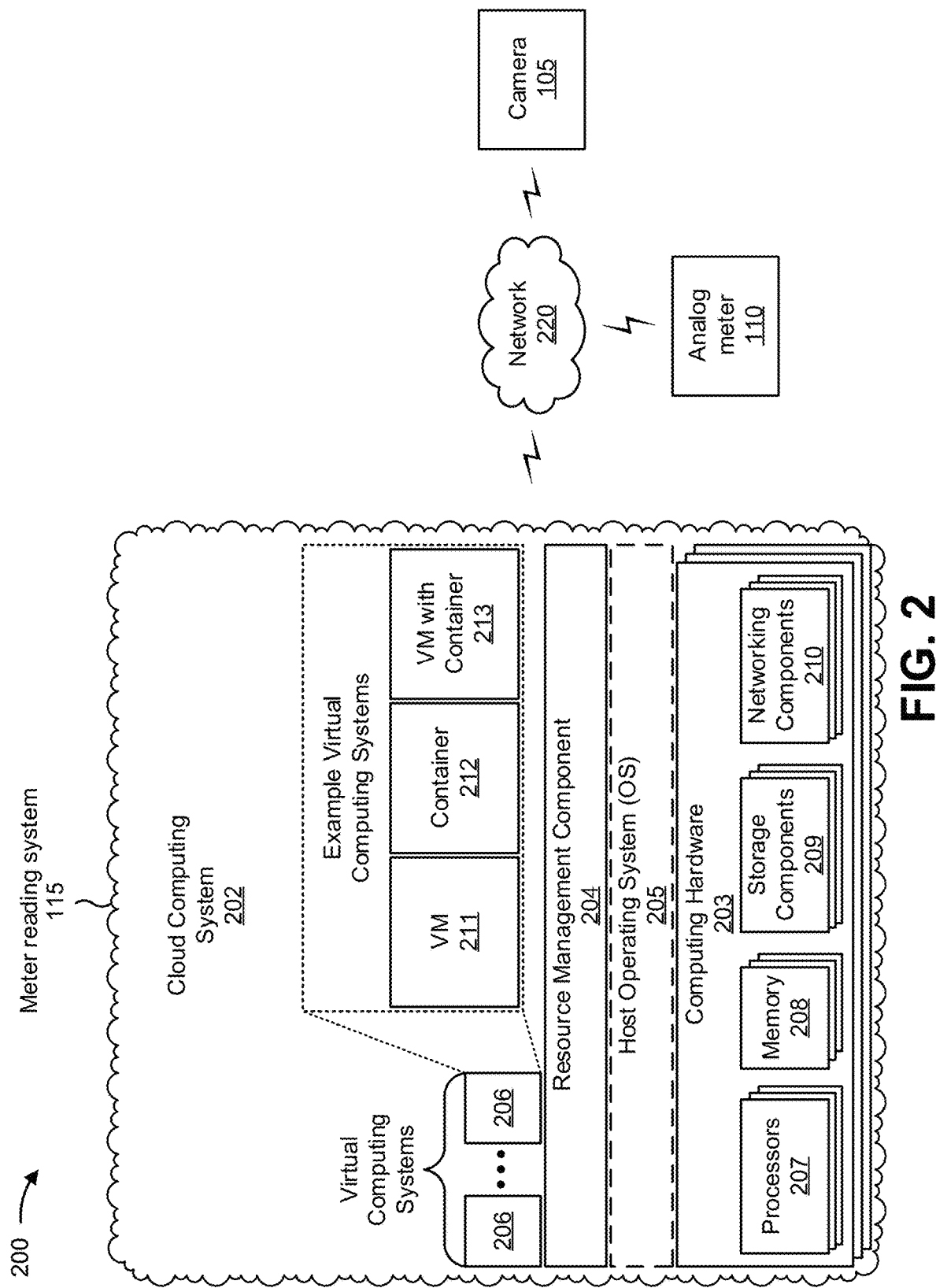
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the meter reading system 115, which may include one or more elements of and/or may execute within a cloud computing system 202. The cloud computing system 202 may include one or more elements 203-213, as described in more detail below. As further shown in FIG. 2, environment 200 may include the camera 105, the analog meter 110, and a network 220. Devices and/or elements of environment 200 may interconnect via wired connections and/or wireless connections.

The camera 105 includes one or more devices capable of receiving, generating, storing, processing, and/or providing information, as described elsewhere herein. The camera 105 may include a communication device and/or a computing device. For example, the camera 105 may include a video camera, a digital camera, and/or a camera associated with a wireless communication device, a mobile phone, a user equipment, a laptop computer, a tablet computer, a desktop computer, or a similar type of device.

The analog meter 110 includes one or more devices capable of receiving, generating, storing, processing, and/or providing information, as described elsewhere herein. For example, the analog meter 110 may include a pressure gauge, an analog multimeter, an analog voltmeter, an analog ammeter, and/or the like. The analog meter 110 may include a pointer or a needle to indicate a measurement level provided on a dial of the analog meter 110. The analog meter 110 may be utilized by equipment (e.g., measurement equipment, manufacturing equipment, and/or the like) to provide a measurement of a parameter (e.g., a pressure, a voltage, amperes, Ohms, and/or the like) associated with the equipment.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the meter reading system 115 may include one or more elements 203-213 of the cloud computing system 202, may execute within the cloud computing system 202, and/or may be hosted within the cloud computing system 202, in some implementations, the meter reading system 115 may not be cloud-based (e.g., may be implemented outside of a cloud computing system) or may be partially cloud-based. For example, the meter reading system 115 may include one or more devices that are not part of the cloud computing system 202, such as device 300 of FIG. 3, which may include a standalone server or another type of computing device. The meter reading system 115 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, a core network (e.g., a fifth generation (5G) core network, a fourth generation (4G) core network, and/or the like), an edge network (e.g., a network that brings computation and data storage closer to a location to improve response times and save bandwidth), a far edge network (e.g., a network of location-based devices, such as customer premise equipment), and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
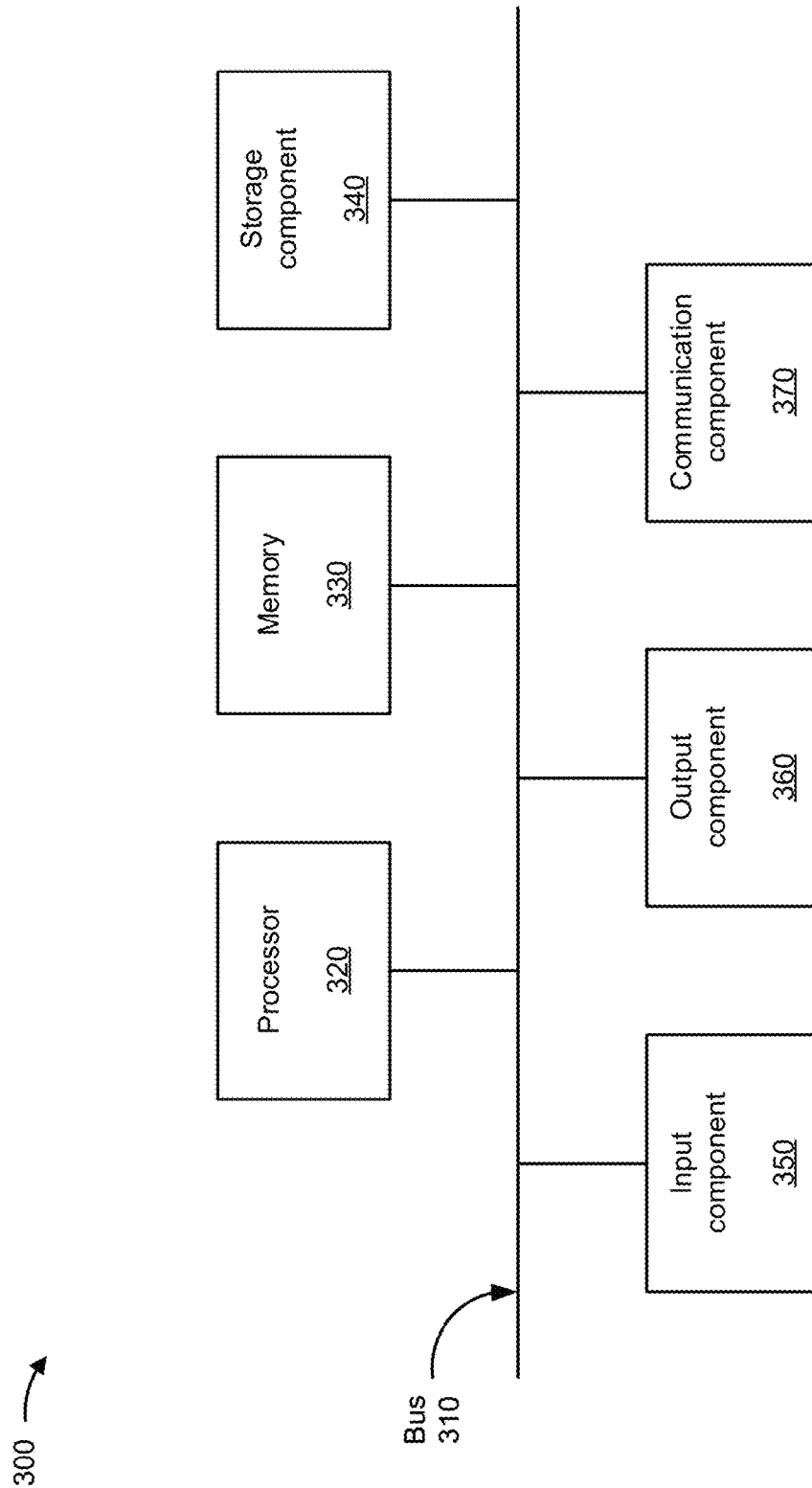
FIG. 3 is a diagram of example components of one or more devices of FIG. 2.

FIG. 3 is a diagram of example components of one or more devices of FIG. 2. The one or more devices may include a device 300, which may correspond to the camera 105 and/or the meter reading system 115. In some implementations, the camera 105 and/or the meter reading system 115 may include one or more devices 300 and/or one or more components of the device 300. As shown in FIG. 3, the device 300 may include a bus 310, a processor 320, a memory 330, a storage component 340, an input component 350, an output component 360, and a communication component 370.

The bus 310 includes a component that enables wired and/or wireless communication among the components of device 300. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform a function. The memory 330 includes a random-access memory, a read only memory, and/or another type of memory (e.g., a flash memory, a magnetic memory, and/or an optical memory). The storage component 340 stores information and/or software related to the operation of device 300. For example, the storage component 340 may include a hard disk drive, a magnetic disk drive, an optical disk drive, a solid-state disk drive, a compact disc, a digital versatile disc, and/or another type of non-transitory computer-readable medium. The input component 350 enables device 300 to receive input, such as user input and/or sensed inputs. For example, the input component 350 may include a touch screen, a keyboard, a keypad, a mouse, a button, a microphone, a switch, a sensor, a global positioning system component, an accelerometer, a gyroscope, and/or an actuator. The output component 360 enables device 300 to provide output, such as via a display, a speaker, and/or one or more light-emitting diodes. The communication component 370 enables the device 300 to communicate with other devices, such as via a wired connection and/or a wireless connection. For example, the communication component 370 may include a receiver, a transmitter, a transceiver, a modem, a network interface card, and/or an antenna.

The device 300 may perform one or more processes described herein. For example, a non-transitory computer-readable medium (e.g., the memory 330 and/or the storage component 340) may store a set of instructions (e.g., one or more instructions, code, software code, and/or program code) for execution by the processor 320. The processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
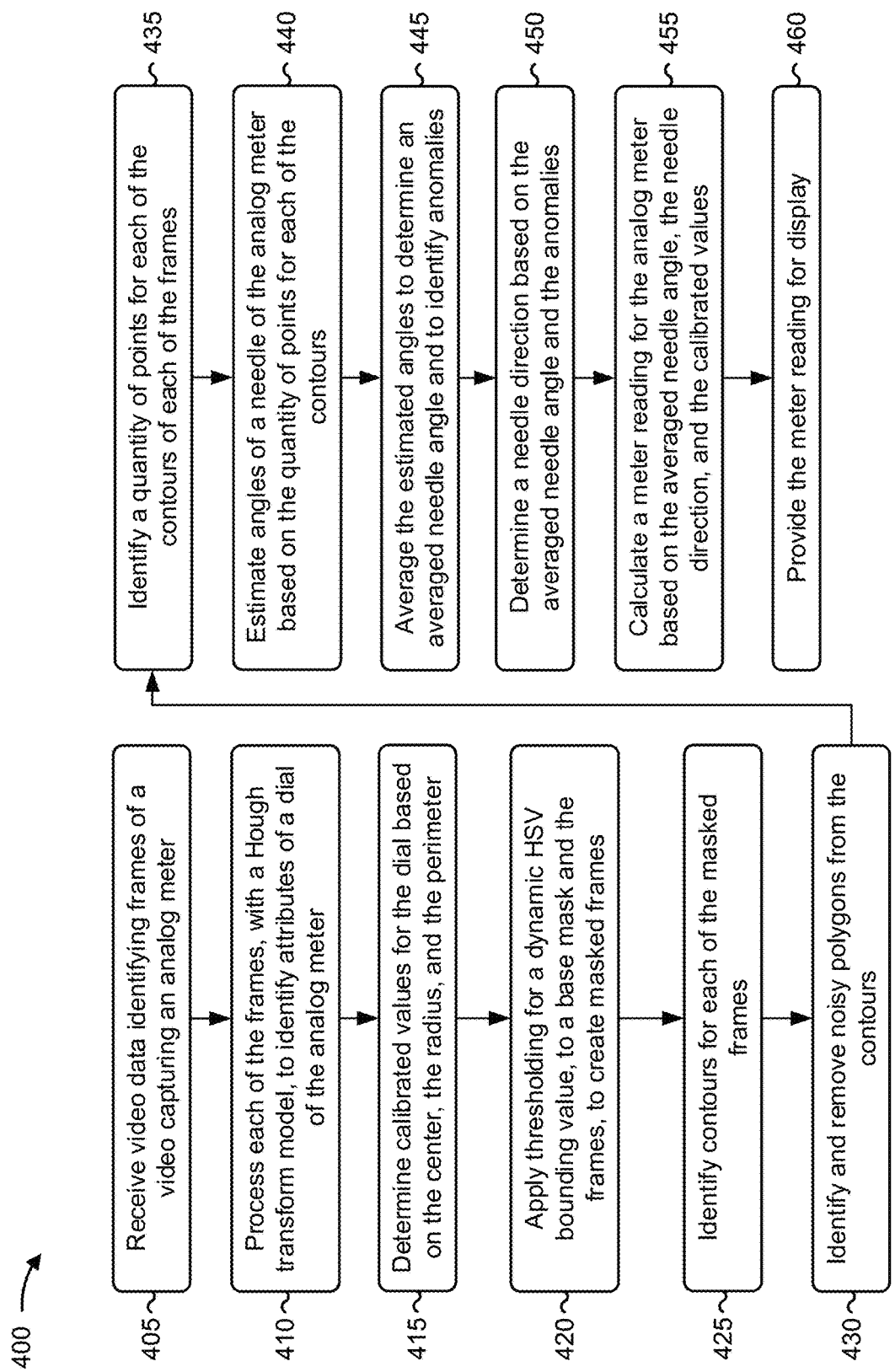
FIG. 4 is a flowchart of an example process for precisely and accurately identifying a meter reading from an analog meter with a needle and dial.

FIG. 4 is a flowchart of an example process 400 for precisely and accurately identifying a meter reading from an analog meter with a needle and dial. In some implementations, one or more process blocks of FIG. 4 may be performed by a device (e.g., the meter reading system 115). In some implementations, one or more process blocks of FIG. 4 may be performed by another device or a group of devices separate from or including the device, such as a camera (e.g., the camera 105). Additionally, or alternatively, one or more process blocks of FIG. 4 may be performed by one or more components of the device 300, such as the processor 320, the memory 330, the storage component 340, the input component 350, the output component 360, and/or the communication component 370.

As shown in FIG. 4, process 400 may include receiving video data identifying frames of a video capturing an analog meter (block 405). For example, the device may receive video data identifying frames of a video capturing an analog meter with a dial and a needle, as described above. In some implementations, the video data is captured by a camera and received from the camera.

As further shown in FIG. 4, process 400 may include processing each of the frames, with a Hough transform model, to identify attributes of a dial of the analog meter (block 410). For example, the device may process each of the frames, with a Hough transform model, to identify a center, a radius, and a perimeter of the dial, as described above.

As further shown in FIG. 4, process 400 may include determining calibrated values for the dial based on the center, the radius, and the perimeter (block 415). For example, the device may determine calibrated values for the dial based on the center, the radius, and the perimeter, as described above. In some implementations, the calibrated values for the dial include a minimum reading of the dial and a maximum reading of the dial.

As further shown in FIG. 4, process 400 may include applying thresholding for a dynamic HSV bounding value, to the base mask and the frames, to create masked frames (block 420). For example, the device may apply a Gaussian blur model to one of the frames to create a base mask, as described above. The device may apply thresholding for a dynamic HSV bounding value, to the base mask and the frames, to create masked frames, as described above.

As further shown in FIG. 4, process 400 may include identifying contours for each of the masked frames (block 425). For example, the device may identify contours for each of the masked frames, as described above.

As further shown in FIG. 4, process 400 may include identifying and removing noisy polygons from the contours (block 430). For example, the device may process the contours, with a point polygon model, to identify and remove noisy polygons from the contours, as described above.

As further shown in FIG. 4, process 400 may include identifying a quantity of points for each of the contours of each of the frames (block 435). For example, the device may identify a quantity of points for each of the contours of each of the frames, as described above. In some implementations, the quantity of points is four points. In some implementations, identifying the quantity of points for each of the contours of each of the frames includes identifying a northern point for each of the contours, identifying a southern point for each of the contours, identifying an eastern point for each of the contours, and identifying a western point for each of the contours.

As further shown in FIG. 4, process 400 may include estimating angles of a needle of the analog meter based on the quantity of points for each of the contours (block 440). For example, the device may estimate angles of the needle of the analog meter based on the quantity of points for each of the contours, as described above.

As further shown in FIG. 4, process 400 may include averaging the estimated angles to determine an averaged needle angle and to identify anomalies (block 445). For example, the device may average the estimated angles to determine an averaged needle angle and to identify anomalies, as described above.

As further shown in FIG. 4, process 400 may include determining a needle direction based on the averaged needle angle and the anomalies (block 450). For example, the device may determine a needle direction based on the averaged needle angle and the anomalies, as described above.

As further shown in FIG. 4, process 400 may include calculating a meter reading for the analog meter based on the averaged needle angle, the needle direction, and the calibrated values (block 455). For example, the device may calculate a meter reading for the analog meter based on the averaged needle angle, the needle direction, and the calibrated values, as described above.

As further shown in FIG. 4, process 400 may include providing the meter reading for display (block 460). For example, the device may provide the meter reading for display, as described above.

Process 400 may include additional implementations, such as any single implementation or any combination of implementations described below and/or in connection with one or more other processes described elsewhere herein.

In some implementations, process 400 includes performing the applying of the Gaussian blur model and the applying of the thresholding for the dynamic HSV bounding value one or more additional times to improve accuracies associated with the masked frames. In some implementations, process 400 includes one or more of creating a report identifying the meter reading and providing the report for display, or providing a notification about the meter reading to a technician associated with the analog meter.

In some implementations, process 400 includes one or more of causing a technician to be dispatched to service equipment monitored by the analog meter, based on the meter reading, or causing an autonomous device to be dispatched to service the equipment monitored by the analog meter, based on the meter reading. In some implementations, process 400 includes causing a technician or an autonomous device to be dispatched to service or replace the analog meter, based on the meter reading. In some implementations, process 400 includes causing a parameter, associated with equipment monitored by the analog meter, to be modified based on the meter reading.

In some implementations, process 400 includes comparing the meter reading with a parameter of equipment monitored by the analog meter, determining whether to modify the parameter based on comparing the meter reading with the parameter, and causing the parameter to be modified when the parameter is determined to be modified.

In some implementations, process 400 includes comparing the meter reading with a parameter of the analog meter, determining whether the analog meter needs to be calibrated based on comparing the meter reading with the parameter, and causing a technician to be dispatched to calibrate the analog meter when it is determined that the analog meter needs to be calibrated.

In some implementations, process 400 includes receiving feedback associated with the meter reading, and retraining one or more of the Hough transform model, the Gaussian blur model, or the point polygon model based on the feedback.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a device, video data identifying frames of a video capturing an analog meter with a dial and a needle;
processing, by the device, each of the frames, with a Hough transform model, to identify a center, a radius, and a perimeter of the dial;
determining, by the device, calibrated values for the dial based on the center, the radius, and the perimeter;
applying, by the device, a Gaussian blur model to one of the frames to create a base mask;
applying, by the device, thresholding for a dynamic hue saturation value (HSV) bounding value, to the base mask and the frames, to create masked frames;
identifying, by the device, contours for each of the masked frames;
processing, by the device, the contours, with a point polygon model, to identify and remove noisy polygons from the contours;
identifying, by the device, a quantity of points for each of the contours of each of the frames;
estimating, by the device, angles of the needle of the analog meter based on the quantity of points for each of the contours;
averaging, by the device, the estimated angles to determine an averaged needle angle and to identify anomalies;
determining, by the device, a needle direction based on the averaged needle angle and the anomalies;
calculating, by the device, a meter reading for the analog meter based on the averaged needle angle, the needle direction, and the calibrated values; and
providing, by the device, the meter reading for display.

2. The method of claim 1, further comprising:
performing the applying of the Gaussian blur model and the applying of the thresholding for the dynamic HSV bounding value one or more additional times to improve accuracies associated with the masked frames.

3. The method of claim 1, wherein the quantity of points is four points.

4. The method of claim 1, further comprising one or more of:
creating a report identifying the meter reading and providing the report for display; or
providing a notification about the meter reading to a technician associated with the analog meter.

5. The method of claim 1, further comprising one or more of:
causing a technician to be dispatched to service equipment monitored by the analog meter, based on the meter reading; or
causing an autonomous device to be dispatched to service the equipment monitored by the analog meter, based on the meter reading.

6. The method of claim 1, further comprising:
causing a technician or an autonomous device to be dispatched to service or replace the analog meter, based on the meter reading.

7. The method of claim 1, further comprising:
causing a parameter, associated with equipment monitored by the analog meter, to be modified based on the meter reading.

8. A device, comprising:
one or more processors configured to:
receive video data identifying frames of a video capturing an analog meter with a dial and a needle;
process each of the frames, with a Hough transform model, to identify a center, a radius, and a perimeter of the dial;
determine calibrated values for the dial based on the center, the radius, and the perimeter;
apply a Gaussian blur model to one of the frames to create a base mask;
apply thresholding for a dynamic hue saturation value (HSV) bounding value, to the base mask and the frames, to create masked frames;
perform the applying of the Gaussian blur model and the applying of the thresholding for the dynamic HSV bounding value one or more additional times to improve accuracies associated with the masked frames;
identify contours for each of the masked frames;
process the contours, with a point polygon model, to identify and remove noisy polygons from the contours;
identify a quantity of points for each of the contours of each of the frames;
estimate angles of the needle of the analog meter based on the quantity of points for each of the contours;
average the estimated angles to determine an averaged needle angle and to identify anomalies;
determine a needle direction based on the averaged needle angle and the anomalies;
calculate a meter reading for the analog meter based on the averaged needle angle, the needle direction, and the calibrated values; and
provide the meter reading for display.

9. The device of claim 8, wherein the one or more processors, to identify the quantity of points for each of the contours of each of the frames, are configured to:
identify a northern point for each of the contours;
identify a southern point for each of the contours;
identify an eastern point for each of the contours; and
identify a western point for each of the contours.

10. The device of claim 8, wherein the calibrated values for the dial include a minimum reading of the dial and a maximum reading of the dial.

11. The device of claim 8, wherein the video data is captured by a camera and received from the camera.

12. The device of claim 8, wherein the one or more processors are further configured to:
compare the meter reading with a parameter of equipment monitored by the analog meter;
determine whether to modify the parameter based on comparing the meter reading with the parameter; and
cause the parameter to be modified when the parameter is determined to be modified.

13. The device of claim 8, wherein the one or more processors are further configured to:
compare the meter reading with a parameter of the analog meter;
determine whether the analog meter needs to be calibrated based on comparing the meter reading with the parameter; and
cause a technician to be dispatched to calibrate the analog meter when it is determined that the analog meter needs to be calibrated.

14. The device of claim 8, wherein the one or more processors are further configured to:
receive feedback associated with the meter reading; and
retrain one or more of the Hough transform model, the Gaussian blur model, or the point polygon model based on the feedback.

15. A non-transitory computer-readable medium storing a set of instructions, the set of instructions comprising:
one or more instructions that, when executed by one or more processors of a device, cause the device to:
receive video data identifying frames of a video capturing an analog meter with a dial and a needle;
process each of the frames, with a Hough transform model, to identify a center, a radius, and a perimeter of the dial;
determine calibrated values for the dial based on the center, the radius, and the perimeter;
apply a Gaussian blur model to one of the frames to create a base mask;
apply thresholding for a dynamic hue saturation value (HSV) bounding value, to the base mask and the frames, to create masked frames;
identify contours for each of the masked frames;
process the contours, with a point polygon model, to identify and remove noisy polygons from the contours;
identify a quantity of points for each of the contours of each of the frames;
estimate angles of the needle of the analog meter based on the quantity of points for each of the contours;
average the estimated angles to determine an averaged needle angle and to identify anomalies;
determine a needle direction based on the averaged needle angle and the anomalies;
calculate a meter reading for the analog meter based on the averaged needle angle, the needle direction, and the calibrated values; and
provide a notification about the meter reading to a technician associated with the analog meter.

16. The non-transitory computer-readable medium of claim 15, wherein the one or more instructions further cause the device to one or more of:
cause a technician to be dispatched to service equipment monitored by the analog meter, based on the meter reading; or
cause an autonomous device to be dispatched to service the equipment monitored by the analog meter, based on the meter reading.

17. The non-transitory computer-readable medium of claim 15, wherein the one or more instructions further cause the device to one or more of:
cause a technician or an autonomous device to be dispatched to service or replace the analog meter, based on the meter reading; or
cause a parameter, associated with equipment monitored by the analog meter, to be modified based on the meter reading.

18. The non-transitory computer-readable medium of claim 15, wherein the one or more instructions further cause the device to:
compare the meter reading with a parameter of equipment monitored by the analog meter;
determine whether to modify the parameter based on comparing the meter reading with the parameter; and
cause the parameter to be modified when the parameter is determined to be modified.

19. The non-transitory computer-readable medium of claim 15, wherein the one or more instructions further cause the device to:

compare the meter reading with a parameter of the analog meter;
determine whether the analog meter needs to be calibrated based on comparing the meter reading with the parameter; and
cause a technician to be dispatched to calibrate the analog meter when it is determined that the analog meter needs to be calibrated.

20. The non-transitory computer-readable medium of claim 15, wherein the one or more instructions further cause the device to:
receive feedback associated with the meter reading; and
retrain one or more of the Hough transform model, the Gaussian blur model, or the point polygon model based on the feedback.

\* \* \* \* \*